Nov. 17, 1953  J. H. TREVITT  2,659,852
CONSTANT SPEED MOTOR DRIVE SYSTEM
Filed Nov. 29, 1950

Inventor
JOHN H. TREVITT

Attorneys

Patented Nov. 17, 1953

2,659,852

UNITED STATES PATENT OFFICE 2,659,852

CONSTANT SPEED MOTOR DRIVE SYSTEM

John H. Trevitt, Bridgeport, Conn., assignor to Dictaphone Corporation, Bridgeport, Conn.

Application November 29, 1950, Serial No. 198,162

16 Claims. (Cl. 318—334)

This invention relates to an improved arrangement for operating electric motors at substantially constant speed from either alternating or direct current power supply lines. It is particularly adapted to meet the requirements of a simple and compact drive system for sound recording and reproducing machines, and especially for dictating machine for use in business offices.

In order for dictating machines to have the widest possible applicability, it is desirable that they be constructed to operate from any of the most commonly available power sources. Thus, dictating machines commonly have been provided with a series-wound motor, a mechanical governor, and a variable resistor connected in series with the motor to permit the speed adjustments necessary for operation from either alternating or direct current power sources. Moreover, in such systems it is sometimes necessary to change the positions of the motor brushes when changing from one power source to another. Such an arrangement is not entirely satisfactory because the necessary adjustments usually must be made by a skilled service man, particularly where it is necessary to adjust the positions of the brushes.

Efforts also have been made to overcome speed changes caused by changes in the nature of the power supply by using an electric contact-type governor, but such arrangements have proved to be unsatisfactory because they produce electrical interference noise in the sensitive electron tube amplifiers usually used in present day dictating machines.

Moreover, it was essential, with such prior art systems, for the operator to know with certainty the character of the supply voltage before connecting the apparatus. This is particularly disadvantageous for salesmen or others who desire to use portable dictating machines in many different locations.

In accordance with the present invention these difficulties are overcome by the provision of a shunt motor of unusual design supplied with power through special rectifier, filter and compensating circuits. With such circuit arrangements the motor operates at a substantially constant speed, whether the power is obtained from a direct current source or from an alternating current source of the frequencies usually encountered in power circuits, and no adjustment of the motor or energizing circuits is required when the machine is shifted from one power source to another. Moreover, the circuit arrangements provide automatic compensation to minimize speed change during the period when the motor is warming up. Also, this novel motor arrangement provides an immediate indication as to whether or not a dictating machine provided with an A. C.-D. C. amplifier is connected with proper polarity to a D. C. supply line. Additionally, this driving motor arrangement is so simple in construction as to be readily adapted to mass production methods and lends itself to compact construction so as to occupy little of the space which usually is at a premium in modern small and lightweight dictating machines.

Accordingly, therefore, it is an object of this invention to provide a universal drive motor system for driving sound recording and reproducing machines and the like at constant speed from the usual A. C. and D. C. power sources without requiring adjustment as it is shifted from one type of power supply to another.

Another object is to provide a motor energizing system that minimizes speed changes during the warm-up period.

It is also an object of this invention to provide such a driving motor arrangement having good speed regulation irrespective of the nature of the power supply.

It is a further object of this invention to provide such a driving motor arrangement which automatically indicates whether such a machine is connected in proper polarity to a D. C. power supply without the need for waiting until the electronic tubes in the amplifier portion thereof are heated to operating conditions.

Other objects and advantages of the invention will be in part obvious from and in part pointed out in the following description considered in conjunction with the accompanying drawings in which.

Figure 1:
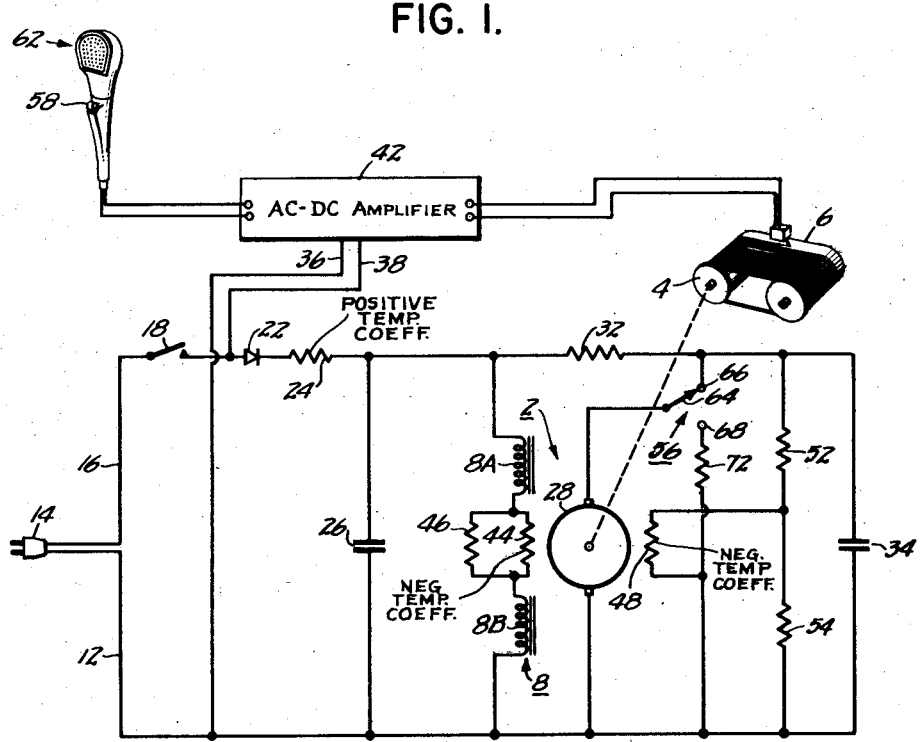
Figure 1 is a diagrammatic showing of a dictating machine incorporating the present invention.

As shown in Figure 1, a shunt-wound direct current motor, generally indicated at 2, is arranged to drive a mandrel 4 of a dictating machine, for example of the general type shown in U. S. Patent 2,318,828 to Yerkovich, in which sound signals are recorded on a plastic belt record 6, and is connected in a novel rectifier and filter circuit in accordance with the present invention so that it will operate at substantially constant speed from either D. C. or A. C. power sources without the need for any adjustment.

In order to prevent change in the speed of the motor 2 with variation in load conditions, while permitting the motor to be energized from either an alternating or direct current source, the rectifier and filter circuit must have good regulation. For example, any alternating voltage ripple in the armature circuit having a peak magnitude greater than the voltage drop caused by the resistance of the armature will produce dynamic braking of the motor during part of each cycle of the supply current.

However, somewhat higher ripple is permissible across the motor field winding, generally indicated at 8, which is shown divided into two windings designated 8A and 8B. This is in part because of a high flux loading of the field circuit, as will be described later, so that the variation in total flux is less, proportionally, than the change in the flux-producing current, and because the inductive impedance of the field winding 8 is used to aid in smoothing the field current.

Accordingly, in the arrangement shown in Figure 1, a special two-stage filter arrangement is provided to control the operating current for the motor 2. Thus, one end of field winding 8B is connected by a lead 12 to one terminal of a power supply plug 14 which is connectible to an ordinary alternating or direct current outlet. The other terminal of plug 14 is connected through a lead 16, an off-on switch 18, a half-wave dry-type selenium rectifier 22, and a series filter resistor 24 to the opposite end of motor field winding 8A. An electrolytic filter condenser 26 is connected in shunt with the motor field winding 8.

The combination of the resistor 24 and the electrolytic condenser 26 is utilized for filtering because the space available in dictating machines does not permit the use of oil or paper-type condensers or the replacement of the resistor 24 with a suitable inductive element. Moreover, in dictating equipment weight considerations are important and the heavy filter chokes therefore are to be avoided.

In order to provide power for the armature 28 of the motor 2, an additional filter resistor 32 and an electrolytic condenser 34 are provided. One side of the armature winding 28 is connected through a suitable commutator and a fixed position brush directly to the supply lead 12, and the other side of the armature is connected through the commutator and its brush and a filter resistor 32 to one end of the first filter resistor 24, the condenser 34 being connected in shunt with the armature winding.

With this arrangement efficient operation is secured because only the filtering necessary for the proper energization of the field winding 8 is provided, whereas the additional filtering which is desirable for the armature circuit is provided by a second filter stage comprising the resistor 32 and the capacitor 34. Thus, the current which energizes the field 8 is filtered by resistor 24 and capacitor 26, whereas the current for the armature 28 is filtered by the resistors 24 and 32 and the capacitors 26 and 34.

The filter resistors 24 and 32 are desirably made as small as possible and are arranged so that they do not carry any current that does not serve the primary function of the filter circuit, i. e. the filter resistors 24 and 32 carry significant current only during the periods when the rectifier is conducting and do not carry any significant current during the period when the capacitors 26 and 34 are supplying power to the field 8 and armature 28, respectively.

This result is achieved by selecting the values of the filter elements so that the ratio of the values of capacitors 26 and 34 is equal to the ratio of the current through the field winding 8 to the current through the armature 28. Values selected in this manner reduce or eliminate circulating currents which cause additional losses, thereby providing superior voltage regulation.

The leads 12 and 16 are connected also by leads 36 and 38 to energize an A. C.-D. C. amplifier, indicated in block form at 42, forming part of the dictating apparatus.

When a direct-current power source was used with former arrangements, in which a series-type universal motor was utilized to permit operation from either alternating or direct current, it was necessary to wait until the cathodes of the vacuum tubes in the amplifier circuit became heated before it could be determined whether the polarity of the supply voltage was correct. Such a period of uncertainty is annoying to the user. In the present arrangement it will be noted that the motor circuit will not operate unless the direct current supply is of the correct polarity. Because a selenium rectifier 22 is utilized in this circuit, no pre-heating is required for the rectifier and it is possible to determine immediately whether the apparatus is properly connected to the D. C. source because the motor itself serves as an audible indicator. This feature is of particular value where the apparatus is frequently moved from one location to another or often must be disconnected from the direct current source.

When a non-synchronous motor is utilized to drive apparatus such as a dictating machine, the speed of the motor may change considerably during the warm-up period. The tendency for speed drift during the warm-up period is especially pronounced when a D. C. shunt motor is operated from a rectifier circuit.

There are several factors which contribute to this speed variation. One such factor is the change in resistance of the field windings 8A and 8B with the increase in temperature resulting from operation of the motor. Under typical circumstances, the resistance of the field winding may change as much as 20 percent during this warm-up period.

Figure 3:
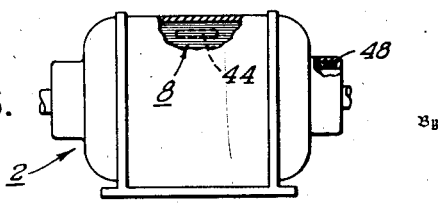
Figure 3 is a diagrammatic representation of a motor having temperature-sensitive resistance elements positioned within the field winding and adjacent the motor bearings.

In order to prevent speed variation which would be produced by the change in the resistance of the field circuit 8, a resistor 44 is connected in series with the field windings 8A and 8B. This resistor 44 is selected to have a negative temperature coefficient of resistance, the resistance value of the resistor 44 decreasing with increasing temperature. This resistor 44 preferably is embedded in the field winding structure as shown in Figure 3, so that the temperature of this compensating resistor always corresponds to the temperature of the field winding, and its temperature-resistance characteristic is selected so that it is the complement of the temperature characteristic of the field winding so that the total resistance of the field circuit remains substantially constant.

In some instances it may be desirable to modify the compensating characteristics of the resistor 44, as, for example, by connecting a fixed resistor 46 in parallel with resistor 44. This resistor 46 may be of the ordinary fixed type having a low positive temperature coefficient, or one substantially independent of temperature, and having a value selected to provide the desired time-resistance characteristic.

In some instances, it may be desirable to select a negative temperature coefficient resistor 44 of such value and temperature characteristic that it over-compensates for the change in speed produced by the resistance variation of the field winding, in order to partially or wholly compensate for changes in speed resulting from temperature rise in other elements of the system.

Another factor which contribute to speed variation during the warm-up period is that the filter circuit tends to deliver a higher voltage with increased temperature. This is in part because the forward resistance of the selenium rectifier 22 decreases with increased temperature, selenium having a negative temperature characteristic, and its inverse resistance increases thereby reducing the losses in the rectifier circuit and increasing the output voltage. Moreover, the power factor of electrilytic condensers increases with increasing temperature in the usual ambient range, so that the losses in these condensers are reduced. Both of these changes occurring in the filter circuit tend to produce higher output voltage.

This effect is most readily overcome by providing the filter resistor 24 with a positive temperature coefficient. Thus, when the positive temperature coefficient resistor 24, whose value is selected to just compensate for the increased output voltage on heating, is mounted so that its temperature is the same as the temperature of the selenium rectifier 22 and the electrolytic condensers 26 and 34, the increased series resistance in the filter circuit offsets the increased voltage that otherwise would be delivered by the power supply.

Another factor which causes a change in the load on the motor during the warm-up period, and therefore tends to produce a change in the speed, is the reduction in the viscosity of the lubricant in the machine bearings with increase in temperature. This increased load on the motor when the machine is cold causes the armature 28 to draw more current. However, the armature 28 is supplied with current through the two filter resistors 24 and 32 so that the voltage drop across these resistors varies with the load applied to the motor 2. This effect would not be serious if large chokes or other filter means could be employed, but because of the space and weight limitations, as pointed out above, such means cannot be employed in dictating machines.

This effect is best compensated by a negative temperature coefficient resistor 48 connected into a circuit in shunt with the armature 28. The resistor 48 may be mounted for example adjacent one of the bearings of the motor 2, as shown in Figure 3, so that its temperature will correspond at all times to the temperature of these bearings. A fixed, temperature-stable resistor 52 is connected in series with the negative temperature coefficient resistor 48 and a fixed resistor 54 is connected in parallel with the negative temperature coefficient resistor 48 and the entire network is connected in shunt with the armature winding 28. In the illustrated example, this particular arrangement is utilized to provide the desired time-resistance characteristic. In one particular embodiment the temperature stable resistors 52 and 54 had resistance volumes of 1500 and 3300 ohms, respectively, and the negative temperature coefficient resistor 48 was selected to have a resistance of 8000 ohms at 38° C., this resistance dropping to 2500 ohms at 85° C. and to 1500 ohms at 115° C. With this arrangement, the value of the shunt resistor 54, when the machine is started, will be substantially lower than that of the compensating resistor 48 so that most of the current will flow through the resistor 54 and the temperature of the compensating resistor 48 will be fixed primarily by the external heating, that is, by the temperature of the bearings of the motor 2. Thus, the resistance values are selected so that the resistance characteristics of resistor 48 will vary at a rate necessary to accomplish the desired compensation.

In some instances it may be satisfactory to utilize only the negative temperature coefficient resistor 48 connected directly between the terminals of the armature winding 28, or in some instances it may be desirable to utilize only the shunt resistor 54 or the series resistor 52.

Moreover, in those instances where other bearings in the apparatus, for example, the bearing which supports the mandrel 4, have an important effect on the loading of the motor 2 and where such bearings are so positioned that their temperature may be significantly different from the temperature of the bearings of the motor 2, it may be desirable to connect several negative temperature coefficient resistor circuits across the armature 28. These circuits may be connected in the same manner as the circuits which include the negative temperature coefficient resistor 48 with the difference that each compensating resistor will be mounted adjacent one of the machine bearings so that the resistor and bearing will have corresponding temperature cycles, and the cumulative effect of these circuits will provide the necessary compensation to maintain uniform speed during the warm-up period.

Although in the past the record drive systems of most dictating machines has been started and stopped by a mechanical clutch because it is necessary to have substantially instantaneous starting and stopping, in accordance with the present invention such a mechanical clutch can be eliminated by using the characteristics of the filter system described herein in a special stopping and starting circuit whereby the motor may be started and stopped with great rapidity.

As shown in Figure 1, a double-throw single-pole switch, generally indicated at 56, is provided for rapid starting and stopping of the motor 2. This switch may be operated, for example, by a relay mechanism (not shown) controlled by a push button 58 mounted on a hand microphone 62 connected to the amplifier 42. As shown in the drawing, the switch 56 has no effect on the field circuit 8 so that this circuit remains energized so long as the main switch 18 is closed, irrespective of whether the motor is running. Moreover, during the time the motor is at rest, the filter condenser 34 is charged almost to the peak voltage of the power supply so that, when the armature 28 is again connected to the power supply, substantially full line voltage that has built up on condenser 34 is applied to the armature 28 resulting in a fast initial start after which the voltage across the armature 28 will be reduced because of the voltage drop across the series filter resistors 24 and 32. Thus, the motor starts rapidly, when the arm 64 of switch 56 is moved to engage the switch contact 66 so that the power supply voltage is applied across the motor armature 28, because of the high voltage applied to the armature 28 by the condenser 34, and because the field is already energized so that there is no delay necessary to allow time for the building up of the magnetic flux in the field circuit.

This arrangement is particularly advantageous when used with a rectifier-filter system of the present invention because the decrease in current through the rectifier 22, when the armature 28 is disconnected, causes a rise in the output voltage of the power supply, for example because of the lower voltage drops across the selenium rectifier 22 and the series resistor 24, so that the current through the field circuit 8 is increased. The higher flux density in the field 8 under these conditions and the increased starting voltage across the armature 28 both act to further reduce the starting time of the motor 2.

The starting time of the motor can be controlled by the selection of suitable values for the armature filter resistor 32 and the capacitor 34.

When the motor is to be stopped, the switch arm 64 is moved into engagement with switch contact 68 so that the supply voltage is disconnected from the armature 28 and a fixed resistor 72 is connected in shunt with the armature 28. The motor then, in effect, acts as a generator and the shunt circuit through switch 56 and the resistor 72 provides dynamic braking to bring the motor to an immediate halt. The stopping time is determined to a large extent by the resistance of the armature winding 28 and the value of the shunt resistor 72. Thus, the value of resistor 72 may be adjusted to give the desired stopping time, and in some instances it will be found that the resistor 72 may be completely eliminated and the switch 56 arranged to apply a short-circuit directly across the terminals of the armature.

As pointed out above, it is undesirable to have circulating currents through the resistors 24 and 32 during that portion of the cycle when power is being applied to the field winding 8 and the armature 28 from the electrolytic condensers 26 and 34, respectively. A simplified circuit diagram representing another arrangement for insuring this result is shown in Figure 2 wherein elements corresponding to similar elements in Figure 1 are identified by identical numerals followed by the letter C.

Figure 2:
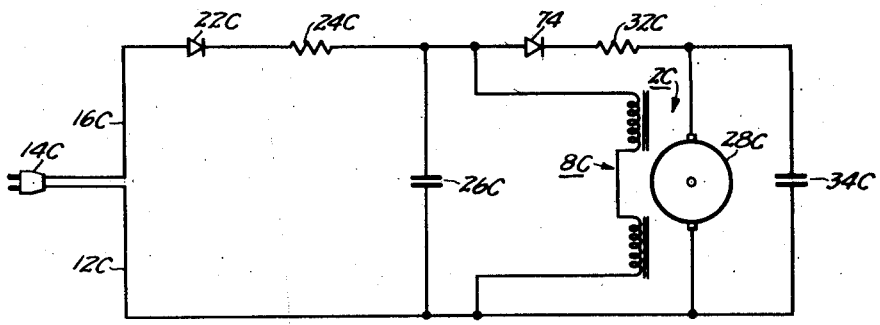
Figure 2 is a diagrammatic showing of another embodiment of the invention.

In the arrangement of Figure 2, a second half-wave dry-type rectifier 74 has been inserted between the filter resistors 24C and 32C so that the current which flows through the armature winding 28C passes successively through rectifiers 22C and 74. Thus, the rectifier 74 prevents the flow of current from the electrolytic condenser 34C, back through the resistor 32C into the field circuit 8C, thereby insuring that condenser 34C will provide current only for the armature winding 28C during the period of time when the condenser 34C is not being charged by the incoming supply voltage.

The terms "negative coefficient resistor" and "positive coefficient resistor" as used herein, are intended to refer to resistance elements which have, in the utilized arrangement, a significant temperature coefficient. Thus, for example, resistor 32 may in fact have a slight positive temperature coefficient if an ordinary commercially available resistor is utilized, but this temperature coefficient will not have any significant effect on the operation of the circuit and such a resistor is not included in the group described herein as having positive temperature coefficients.

In recording apparatus and in various other machines, the motor must be quiet, small in size, and must not cause any electrical interference in the high gain amplifiers utilized in the recording apparatus. Quietness of the motor is best obtained by operating the motor at a low speed in order to reduce the brush noise. However, low speed and small size of the motor usually require a larger number of turns in the armature with a correspondingly high armature resistance. This high armature resistance generally makes the motor more sensitive to changes in load, and poor speed regulation results. In accordance with the present invention this disadvantage of high armature resistance preferably can be overcome by the use of a special motor in which a very low armature current is utilized. In one such motor an armature voltage drop of less than 5 volts is produced for an input voltage of 115 volts, that is, the armature winding develops 110 volts counter-electromotive force. This desirable characteristic is obtained by shaping the armature laminations to obtain a much smaller coil space and a much larger iron path than is usual in small size motors and by providing an extremely strong field flux. In a 3 watt motor, for instance, the armature current, under operating conditions, is 15 milliamperes, while the field current is 60 milliamperes. Thus, even with an armature resistance as high as 300 ohms, there is only a 4.5 volts drop caused by the armature resistance. The high field strength and the low armature current assist in preventing electrical interference in the high gain amplifier. The armature current is so low that the commutation of this current does not cause sparking at the motor brushes. Also, this relatively high armature resistance helps to damp out any oscillating currents which may occur in the coils that are shorted during commutation. Although the features of the present invention are applicable to motors constructed in the conventional manner, additional advantages are obtained if the motor is designed so that the field current is at least two times as great as the current through the armature.

From the foregoing, it will be observed that the motor drive system embodying this invention is well adapted for the ends and objects hereinbefore set forth and to be economically constructed, since the separate elements are, for the most part, already available from commercial production. The invention and its numerous attendant advantages will be fully understood from the foregoing description, and it is obvious that numerous changes may be made in the form, construction, and arrangement of the parts without departing from the spirit or scope of the invention or sacrificing its attendant advantages, and that various elements and features of the invention may be utilized to advantage without a corresponding use of other features.

What is claimed is:

1. For use in a sound recording or reproducing system adapted to be operated by either direct or alternating current, a drive system comprising an input circuit connectible to an alternating or direct current power source, a rectifier connected to said input circuit, first and second filter sections each having a current resisting element and an energy storage element, first circuit means connecting said first filter section to said rectifier and said second filter section to the output of said first filter section, a shunt-wound electric motor having field and armature windings, second circuit means connecting said armature winding to the output of said second filter section, and third circuit means excluding said second filter section and connecting said field winding to the output of said first filter section, whereby current passing through said armature winding is modified by both of said filter sections and current passing through said field winding is modified only by said first filter section.

2. For use in a sound recording or reproducing system adapted to be operated by either direct or alternating current, a drive system comprising an input circuit connectible to an alternating or direct current power source, a rectifier connected to said input circuit, first and second filter sections each having a current resisting element and a filter condenser, first circuit means connecting said first filter section to said rectifier and said second filter section to the output of said first filter section, a shunt-wound electric motor having field and armature windings, second circuit means connecting said armature winding to the output of said second filter section, and third circuit means connecting said field winding in parallel with the filter condenser of said first filter section, whereby current passing through said armature winding is modified by both of said filter sections and current passing through said field winding is modified only by said first filter section.

3. For use in a sound recording or reproducing system adapted to be operated by either direct or alternating current, a drive system comprising an input circuit connectible to an alternating or direct current power source, a rectifier connected to said input circuit, first and second filter sections each having a current resisting element and a filter condenser, a first circuit means connecting said first filter section to said rectifier and said second filter section to the output of said first filter section, a shunt-wound electric motor having field and armature windings, second circuit means connecting said armature winding to the output of said second filter section, and third circuit means connecting said field winding to the output of said first filter section, the ratio of the capacitance value of the condenser in said first filter section to the capacitance value of the condenser in said second filter section being substantially equal to the ratio of the current through said field winding to the current through said armature winding under operating conditions.

4. For use in a sound recording or reproducing system adapted to be operated by either direct or alternating current, a drive system comprising an input circuit connectible to an alternating or direct current power source, a rectifier connected to said input circuit, first and second filter sections each having a resistor and a condenser, at least one of said resistors having a positive temperature coefficient, first circuit means connecting said first filter section to said rectifier and said second filter section to the output of said first filter section, a shunt-wound electric motor having field and armature windings, second circuit means connecting said armature winding to the output of said second filter section, and third circuit means connecting said field winding to the output of said first filter section.

5. For use in a sound recording or reproducing system adapted to be operated by either direct or alternating current, a drive system comprising an input circuit connectible to an alternating or direct current power source, a half-wave rectifier connected to said input circuit, first and second filter sections each having a condenser and a resistor, first circuit means connecting said first filter section to said rectifier and said second filter section to the output of said first filter section, a shunt-wound electric motor having field and armature windings, second circuit means connecting said armature winding to the output of said second filter section, and third circuit means excluding said second filter section and connecting said field winding to the output of said first filter section, whereby current passing through said armature winding is modified by both of said filter sections and current passing through said field winding is modified only by said first filter section, the current through said field winding being equal in magnitude to a value at least two times as great as the magnitude of the current through said armature winding.

6. For use in a sound recording or reproducing system adapted to be operated by either direct or alternating current, a drive system comprising an input circuit connectible to an alternating or direct current power source, a rectifier connected to said input circuit, first and second filter sections each comprising a series-connected resistor and a shunt-connected electrolytic condenser, said resistor of said first section having a positive temperature coefficient, first circuit means connecting said first filter section to said rectifier and said second filter section to the output of said first filter section, a shunt-wound electric motor having field and armature windings, second circuit means connecting said field winding to the output of said first filter section, and third circuit means connecting said armature winding in parallel with said condenser of said second filter section.

7. For use in a sound recording or reproducing system adapted to be operated by either direct or alternating current, a drive system comprising an input circuit connectible to an alternating or direct current power source, a first half-wave rectifier connected to said input circuit, a first filter section having a current resisting element and an energy storage element connected to said first rectifier, a second half-wave rectifier connected to the output of said first filter section, a second filter section having a current resisting element and an energy storage element connected to the output of said second rectifier, a shunt-wound electric motor having field and armature windings, first circuit means connecting said armature winding to the output of said second filter section, and second circuit means excluding said second filter section and connecting said field winding to the output of said first filter section, whereby current passing through said armature winding is modified by both of said filter sections and current passing through said field winding is modified only by said first filter section, and reverse current from said second to said first filter section is prevented by said second rectifier.

8. For use in a sound recording or reproducing system adapted to be operated by either direct or alternating current, a drive system comprising an input circuit connectible to an alternating or direct current power source, a first half-wave selenium rectifier connected to said input circuit, a first filter section having a series-connected resistor and a shunt-connected electrolytic condenser, and being connected to the output of said first rectifier, a second half-wave selenium rectifier connected to the output of said first filter section, a second filter section having a series-connected resistor and a shunt-connected electrolytic condenser, and being connected to the output of said second rectifier, a shunt-wound electric motor having field and armature windings, first circuit means connecting said armature winding in parallel with the condenser of said second filter section, and second circuit means excluding said second filter section and connecting said field winding in parallel with the condenser of said first filter section.

9. For use in a sound recording or reproducing system adapted to be operated by either direct or alternating current, a drive system comprising an input circuit connectible to an alternating or direct current power source, a rectifier connected to said input circuit, first and second filter sections each having a current resistting element and an energy storage element, first circuit means connecting said first filter section to said rectifier and said second filter section to the output of said first filter section, a shunt-wound electric motor having field and armature windings, second circuit means connecting said armature winding to the output of said second filter section, third circuit means excluding said second filter section and connecting said field winding to the output of said first filter section, whereby current passing through armature winding is modified by both of said filter sections and current passing through said field winding is modified only by said first filter section, a low impedance conductive circuit, and switch means arranged to disconnect said armature winding from said second filter section and to connect said conductive circuit in parallel with said armature winding.

10. For use in a sound recording or reproducing system adapted to be operated by either direct or alternating current, a drive system comprising an input circuit connectible to an alternating or direct current power source, a rectifier connected to asid input circuit, first and second filter sections each having a series-connected resistor and a shunt-conected electrolytic condenser, first circuit means connecting said first filter section to said rectifier and said second filter section to the output of said first filter section, a shunt-wound electric motor having field and armature windings, second circuit means including a switch and normally connecting said armature winding in shunt with said condenser of said second filter section, third circuit means connecting said field winding in shunt with the condenser of said first filter section, and a conductive circuit, said switch being arranged to disconnect said armature winding from said second filter section and to connect said conductive circuit in shunt with said armature winding.

11. A drive system adapted to be operated by either direct or alternating current, comprising an input circuit connectible to an alternating or direct current power source, a rectifier connected to said input circuit, first and second filter sections each having a current resisting element and an energy storage element, first circuit means connecting said first filter section to said rectifier and said second filter section to the output of said first filter section, a shunt-wound electric motor having field and armature windings, second circuit means connecting said armature winding to the output of said second filter section, third circuit means excluding said second filter section and connecting said field winding to the output of said first filter section, whereby current passing through said armature winding is modified by both of said filter sections and current passing through said field winding is modified only by said first filter section, and switch means for disconnecting said armature from said second filter section and for simultaneously applying a short circuit to said armature.

12. A motor drive system adapted to be operated by either direct or alternating current comprising an input circuit connectible to an alternating or direct current power source, a rectifier connected to said input circuit, first and second filter sections each having a current resisting element and an energy storage element, first circuit means connecting said first filter section to said rectifier and said second filter section to the output of said first filter section, a shunt-wound electric motor having field and armature windings, second circuit means connecting said armature winding to the output of said second filter section, third circuit means connecting said field winding to the output of said first filter section, whereby current passing through said armature winding is modified by both of said filter sections and current passing through said field winding is modified only by said first filter section, and a conductive circuit including a negative temperature coefficient resistor connected in parallel with said armature.

13. For use in a sound recording or reproducing system adapted to be operated by either direct or alternating current, a drive system comprising an input circuit connectible to an alternating or direct current power source, a rectifier connected to said input circuit, first and second filter sections each having a series connected resistor and a shunt-connected condenser, first circuit means connecting said first filter section to said rectifier and said second filter section to the output of said first filter section, a shunt-wound electric motor having field and armature windings and bearings supporting said armature winding, second circuit means connecting said armature winding to the output of said second filter section, third circuit means excluding said second filter section and connecting said field winding to the output of said first filter section, a compensating circuit including a first negative temperature coefficient resistor and connected in series with said field winding and positioned adjacent thereto, and a circuit connected in shunt with said armature winding and including a second negative temperature coefficient resistor positioned adjacent one of said bearings.

14. For use in a sound recording or reproducing system adapted to be operated by either direct or alternating current, a drive system comprising an input circuit connectible to an alternating or direct current power source, a selenium rectifier connected to said input circuit, first and second filter sections each having a series connected resistor an a shunt-connected electrolytic condenser, said first filter section including a positive temperature coefficient resistor connected in series therewith, first circuit means connecting said first filter section to said rectifier and said second filter section to the output of said first filter section, a shunt-wound electric motor having field and armature windings and bearings supporting said armature winding, second circuit means connecting said armature winding to the output of said second filter section third circuit means excluding said second filter section and connecting said field winding to the output of said first filter section, compensating circuit including a first negative temperature coefficient resistor connected in series with said field winding and positioned adjacent thereto, and a circuit connected in shunt with said armature winding and including a second negative temperature coefficient resistor positioned adjacent one of said bearings.

15. In an electric motor drive system for operation from alternating or direct current source wherein the alternating current is rectified and filtered, apparatus comprising an electric motor having an armature winding and a field having first and second windings, a first circuit for supplying direct current to said armature winding, a second circuit for supplying direct current to said field winding, a negative temperature coefficient resistor embedded in said field winding so as to maintain the same temperature as said field windings and connected in series therebetween, and a temperature stable resistor connected in parallel with said negative temperature coefficient resistor.

16. In an electric motor drive system, apparatus comprising an electric motor having field and armature windings, a first circuit for supplying direct current to said field winding, a second circuit for supplying direct current to said armature winding and including a resistance-capacitance network, a condenser thereof being connected in shunt with said armature winding and a resistor thereof being connected in series with said armature winding, and a compensating circuit connected in parallel with said armature and including a negative temperature coefficient resistor positioned adjacent said armature winding.

JOHN H. TREVITT.

References Cited in the file of this patent

UNITED STATES PATENTS

| Number | Name | Date |
|---|---|---|
| 1,600,827 | Latour | Sept. 21, 1926 |
| 1,957,208 | Harris | May 1, 1934 |
| 2,134,900 | Von Ohlsen | Nov. 1, 1938 |
| 2,295,305 | Summers | Sept. 8, 1942 |
| 2,490,093 | Roberts et al. | Dec. 6, 1949 |
| 2,505,135 | Miles | Apr. 25, 1950 |